United States Patent Office 3,445,739
Patented May 20, 1969

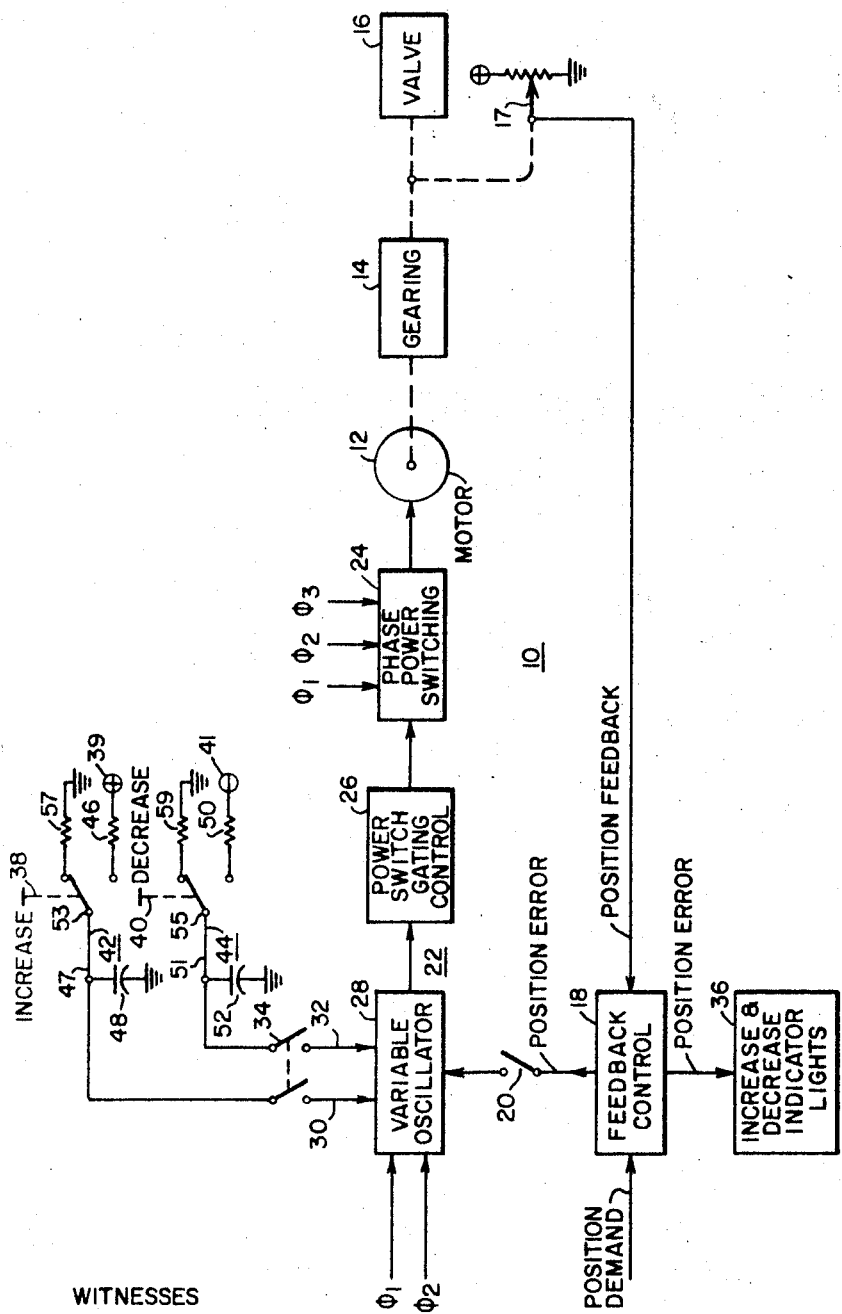

3,445,739
VARIABLE SPEED CONTROL FOR POSITION REGULATOR MOTORS
Lyle F. Martz, Verona, Pa., assignor, by mesne assignments, to Westinghouse Electric Corporation, Pittsburgh, Pa., a corporation of Pennsylvania
Filed Jan. 27, 1966, Ser. No. 523,422
Int. Cl. H02p 1/54, 5/46, 7/74
U.S. Cl. 318—18          3 Claims

ABSTRACT OF THE DISCLOSURE

A control system determines the energization level of a positioning motor in response to a control voltage. The control voltage is coupled to the control system input through an RC network to produce an input voltage rise rate which is less than the control voltage rise rate.

Cross reference to related applications

Ser. No. 521,931, entitled "Improved Alternating Current Motor Control System Particularly for Position Regulating Applications," filed by J. Gill and G. Rouvalis on Jan. 20, 1956, and assigned to the present assignee.

Background of the invention

The present invention relates to motor control systems and more particularly to variable speed input controls for position regulator motors.

In an automatic position regulator motor control system, a position error signal is used to drive the motor until the relative values of the position feedback and position demand signals denote the fact that the motor load is in the zero error position. A manual or an automatic controller can be used to generate the position demand signal. A specific example of an automatic control system used in operating a position regulator motor is set forth in the above indicated Gill and Rouvalis patent application. In many cases, it is desirable to provide selectable manual control for automatic position regulation systems and in that event the feedback loop is switched to an open state and the motor is controlled by a manual push button switch or the like until the demand position is satisfied as indicated by suitable means such as indicating circuitry responsive to the open loop position error signal.

Desired or required changes in position are often so small that position overshoot results in the various control systems when the position demand controller or the feedback circuitry or the manual control switch is operated to initiate a position change. The overshoot problem is particularly acute in an automatic motor control system which is provided with high overall gain to achieve fast automatic position regulation. Similar problems are encountered in purely manually operated control systems for position regulator motors.

As an illustration, a valve stem may be subjected to position regulation and it may be desirable to achieve full stroke movement in a relatively short time such as 20 seconds. Simultaneously, it may be desirable to provide for incremental valve position changes of about 0.1% of the total stroke movement. Input voltage to the motor control system for motor energization is thus required for about .02 second or less in order to produce the small incremental or step position changes. Since a manual contact has a minimum closure time of about ⅕ second due to human and mechanical response limitations, manual switching control is inadequate to the task of small step position changes in a fast response position motor control system. Similarly, in the automatic mode of operation in an automatic position control system, calls for small position changes can create instability and adversely affect system accuracy, particularly when the system is characterized with relatively high gain and fast response time. It is therefore desirable that an input variable speed control be arranged inexpensively and simply for a position regulator motor to produce accurately and quickly a wide range of demand and corrective position changes.

Summary of the invention

In accordance with the principles of the present invention, an input variable motor speed control includes an input manual switching arrangement and, if desired, an automatic input switch controller connected through a coupling circuit to a motor control system to produce improved position regulation in a simple and inexpensive manner. Preferably, the coupling circuit includes a resistor-capacitor network which operates to produce a motor speed proportional to the input switch closure time or on-time. Small incremental position changes are thus accurately and quickly achieved consistently with fast and accurate response for large position changes.

It is therefore an object of the invention to provide a novel variable speed control for position regulator motors which operate with improved position control.

Another object of the invention is to provide a novel variable speed control for position regulator motors which is effective to produce stable and accurate control for small position changes consistently with fast and accurate control for large position changes.

These and other objects of the invention will become more apparent upon consideration of the following detailed description along with the attached drawing.

Brief description of the drawing

The only figure shows a schematic diagram of a variable speed position regulator motor control arranged in accordance with the principles of the invention.

Description of the preferred embodiment

More specifically, in the drawing there is shown a control system 10 employed to control the speed of a position regulating motor 12 of suitable type such as a three-phase alternating current motor. The motor 12 can be connected through a gear train 14 to a device such as a valve 16 which is to be subjected to position control.

If desired, and as indicated in the aforementioned copending application, the control system 10 can use feedback signals so that large position errors are corrected at high or maximum motor speed and small position errors are corrected at low or stepping motor speed until the position error becomes zero valued. Thus, in this instance, a feedback control network 18 is connected from a potentiometer 17 at the motor output through an automatic mode selector switch 20 to an arrangement 22 which controls the energization level of the motor 12 in producing position error correction.

In the control arrangement 22, a power switching network 24 is operated by a gating control 26 in applying the three-phase line voltages to the motor primary windings. The switching devices in the power switch network 24 can be silicon controlled rectifiers and switch gating can be produced by high frequency signals generated by the gating control 26. Motor speed is preferably varied by varying the rate at which the power switches are gated, and each gating period is preferably equal to a half-cycle or a full cycle of one of the phase voltage waveforms.

The preferred speed control is obtained by the employment of a variable oscillator 28 which generates pulses in synchronism with one of the phase voltage waveforms and at a rate dependent on the magnitude of the position error signal when the control system 10 is switched to the automatic mode of operation or the magnitude of an increase or decrease signal on conductor 30 or conductor 32 when the control system 10 is in the manual mode of operation. A selector switch 34 provides for the manual operating mode, and it can be mechanically linked with the automatic selector switch 20 so that each is closed when the other is open.

When the automatic selector switch 20 is open, an indicator light system 36 is operated by the feedback position error signal to indicate the direction in which position error correction is required. For example, the increase light can indicate that the valve opening must be increased and the decrease light can indicate a call for a decreased valve opening.

Reference is made to the aforementioned copending application for a more detailed description of the feedback control 18 and the control arrangement 22. In applications of the invention other than the one being described, a feedback control may or may not be used and the control arrangement 22 can be embodied in other forms.

When the manual mode of operation is selected for the control system 10, it is desirable that push-button switches 38 and 40 or the like be conveniently operable to apply positive or negative voltage from bus 39 or 41 to the motor control input and ultimately to produce predetermined valve position changes both quickly and accurately without overshoot. The predetermined position changes can be those required to match the position demand and position feedback signals in the feedback control 18 as indicated by the indicator light system 36. Further, it is desirable that fast and accurate and stable position control be provided for both large and small position changes.

The motor speed is substantially proportional to the voltage input to the variable oscillator 28 and in the automatic mode of operation it is substantially independent of mechanical load when feedback velocity control is employed. For fast control of large position changes, fast system response enables full stroke movement of the valve 16 to be achieved in a relatively short period of time (such as 20 seconds) after input voltage is applied to the oscillator 28. For small position changes, such as 0.1% of the total stroke movement, the switching time of the manual input control switches in conventional systems is too great to prevent position overshoot with the system response characteristics preset for fast full stroke movement.

In accordance with the principles of the present invention, the control system 10 includes a coupling circuit 42 or 44 connected between the positive manual supply bus 39 or the negative manual supply bus 41 and the control arrangement 22 or the variable oscillator 28. With the cooperative functioning of the coupling circuits 42 and 44, the control system 10 produces fast and accurate position regulation for both large and small position errors. In particular, full valve stroking time is not increased appreciably while accurate step control is provided to correct small position errors without overshoot. In operation, the coupling circuit 42 or 44 controls the rate at which voltage rises at the input conductor 30 or 32 of the variable oscillator 28 after the increase push-button switch 38 or the decrease push-button switch 40 has been operated to produce a position change.

The coupling circuit 42 preferably comprises an RC network including a resistor 46 connected in series between the positive bus 39 and the variable oscillator input conductor 30 when the increase push-button switch 38 is operated. A capacitor 48 completes the network and is connected from the voltage supply circuit to a ground or common connection. The coupling circuit 44 similarly includes a resistor 50 and a capacitor 52. Resistors 57 and 59 provide for capacitor discharge following switch reopening.

Adjustment of the RC time constant of each circuit 42 or 44 provides the desired voltage rise time at the variable oscillator input. Thus, when the control system 10 is switched for manual operation, the variable oscillator input voltage is proportional to the time of closure of the push-button switch 38 or 40 and, since the motor speed is proportional to the variable oscillator input voltage, the motor speed accordingly is in turn proportional to the time of closure of the push-button switch 38 or 40.

In particular, the RC time constant of each coupling circuit 42 or 44 can be adjusted so that full input voltage is applied to the variable oscillator in a relatively short time after operation of the push-button switch 38 or 40 thereby producing little change in the total time required for full stroke valve movement. Simultaneously, the RC time constant can be just great enough to provide position changes as small as 0.1% or a smaller percentage of the total stroke movement without position overshoot in the minimum switching time period required for closing and opening the push-button switch 38 or 40. Thus, the minimum manual switching time is approximately ⅕ second and with a preset full stroke time of 20 seconds a position change of 1% is conventionally produced in the minimum switching time period. With the employment of the coupling circuits 42 and 44, a position change as low as 0.1% or less is realized while the full stroke time is held substantially at the value of 20 seconds.

In some applications, it may be desirable to effect similar circuit operation in the automatic mode of operation. In that event, the resistors 46 and 50 can be series connected at points indicated by the reference characters 47 and 51 between the capacitors 48 and 52 and the switches 38 and 40. The automatic switch 20 can be connected to make connection to junction points 53 and 55 instead of to the variable oscillator 28. When the coupling circuits 42 and 44 are connected as described in the automatic control system, positioning accuracy and control stability can often be achieved without substantially affecting system response time.

The foregoing description has been presented only to illustrate the principles of the invention. Accordingly, it is desired that the invention not be limited by the embodiment described, but rather that it be accorded an interpretation consistent with the scope and spirit of its broad principles.

What is claimed is:

1. A variable speed control system for a position regulating motor, said system comprising a control arrangement for varying the level at which the motor is energized from power supply terminals in response to the magnitude of voltage applied to an input terminal of said control arrangement, a control terminal at which a position change voltage signal is applied, means including an RC network for coupling said control terminal with said input terminal to produce a voltage rise rate at said input terminal less than the voltage rise rate at said control terminal when a position change voltage is applied to said control terminal, and a manual switch for connecting and disconnecting said RC network between said input and control terminals.

2. A variable speed control system for a position regulating motor as set forth in claim 1, wherein a pair of control terminals are included to produce bidirectional motor movement, a pair of input terminals are provided for said control arrangement, respective coupling means including respective RC networks are connected between said input terminals and said control terminals, respective manual switches are connected between said RC networks and said control terminals, and said control terminals are respectively connectable to external positive and negative supply voltages.

3. A variable speed control system for a position regulating motor as set forth in claim 2, wherein said speed control system further includes an automatic feedback controller selectably coupled to an input of said control arrangement when said speed control system is in the automatic mode of operation, said coupling means is connected to said input terminals of said control arrangement when said speed control system is in the manual mode of operation, and indicating means is responsive to said feedback controller to provide an indication of position error for use in manually controlling said manual switches in the manual mode of operation.

References Cited

UNITED STATES PATENTS

| | | | |
|---|---|---|---|
| 2,787,751 | 4/1957 | Davidson | 318—443 |
| 2,701,327 | 2/1955 | Ringoen. | |
| 3,310,721 | 3/1967 | Möller. | |

B. DOBECK, *Primary Examiner.*

U.S. Cl. X.R.

318—341, 443